(12) United States Patent
Sicz et al.

(10) Patent No.: US 7,422,224 B2
(45) Date of Patent: Sep. 9, 2008

(54) ADJUSTABLE BICYCLE SEAT POST ASSEMBLY

(75) Inventors: Wayne Sicz, Polson, MT (US); Arlen Wisseman, Polson, MT (US)

(73) Assignee: Kimir Seatpost, Polson, MT (US)

( * ) Notice: Subject to any disclaimer, the term of this patent is extended or adjusted under 35 U.S.C. 154(b) by 334 days.

(21) Appl. No.: 11/279,014

(22) Filed: Apr. 7, 2006

(65) Prior Publication Data
US 2006/0175792 A1    Aug. 10, 2006

Related U.S. Application Data

(63) Continuation-in-part of application No. 10/823,464, filed on Apr. 13, 2004, now Pat. No. 7,025,522.

(51) Int. Cl.
*B62J 1/08* (2006.01)
*B62K 19/36* (2006.01)

(52) U.S. Cl. .................. 280/274; 280/281.1; 248/408; 403/109.2

(58) Field of Classification Search ............... 280/274, 280/281; 403/109.1, 109.2, 109.3; 248/407, 248/408; 482/57; 297/215.13
See application file for complete search history.

(56) References Cited

U.S. PATENT DOCUMENTS

| 510,993 | A | 12/1893 | Riess |
|---|---|---|---|
| 578,011 | A | 3/1897 | Girardet |
| 3,596,958 | A | 8/1971 | Bowerman |
| 4,113,221 | A | 9/1978 | Wehner |
| 4,150,851 | A | 4/1979 | Cienfuegos |
| 4,919,464 | A | 4/1990 | Richards |
| 5,044,592 | A | 9/1991 | Cienfuegos |
| 5,061,112 | A | 10/1991 | Monford, Jr. |
| 5,271,253 | A | 12/1993 | Cassada et al. |
| 5,660,495 | A | 8/1997 | Atsukawa |
| 5,713,555 | A | 2/1998 | Zurfluh et al. |
| 6,202,971 | B1 | 3/2001 | Duncan |

(Continued)

FOREIGN PATENT DOCUMENTS

EP        0148979 A2    7/1985

(Continued)

*Primary Examiner*—Tony H. Winner
(74) *Attorney, Agent, or Firm*—Dickinson Wright PLLC

(57) ABSTRACT

An adjustable-height bicycle seat post assembly comprises a hollow seat post for supporting a bicycle seat slidably on plastic guides or shims inside a hollow tube. The hollow tube clamps into the frame of a bicycle. A mainspring forces the post upward, but a locking mechanism interconnects the post with the tube in various fixed positions relative to the tube. The locking mechanism includes a housing, which supports a plunger for reciprocating movement into and out of engagement with holes on the post. The locking mechanism is affixed to the outside of the tube to bear shearing forces on the plunger. An endcap on the locking mechanism and a topcap on the tube protect the assembly from foreign debris. The locking mechanism may be manipulated remotely using a magnetic switch assembly or manually using a mechanical assembly. A lost motion coupling is integrated into the locking mechanism and/or actuator assembly to enable the remote actuator to be moved or deployed while the latch remains trapped under the influence of a dominant shear load. The lost motion coupling is also effective to allow an operator to deploy the remote actuator at any convenient time prior to a desired change in seat height.

38 Claims, 11 Drawing Sheets

U.S. PATENT DOCUMENTS

| | | |
|---|---|---|
| 6,354,557 B1 | 3/2002 | Walsh |
| 6,478,278 B1 | 11/2002 | Duncan |
| 6,585,215 B2 | 7/2003 | Duncan |
| 6,631,947 B2 | 10/2003 | Faltings |
| 6,640,398 B2 | 11/2003 | Hoffman |
| 2002/0185581 A1 | 12/2002 | Trask |
| 2004/0208687 A1 | 10/2004 | Sicz et al. |

FOREIGN PATENT DOCUMENTS

| | | |
|---|---|---|
| GB | 2116128 A | 9/1983 |
| JP | 4-362482 | 12/1992 |

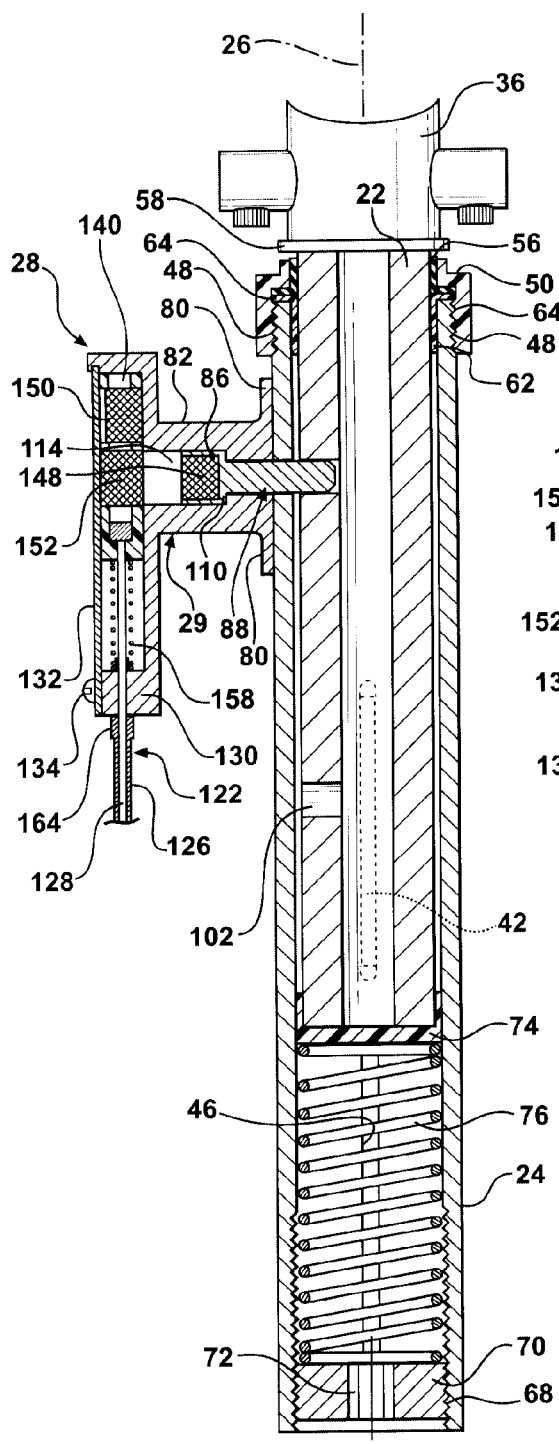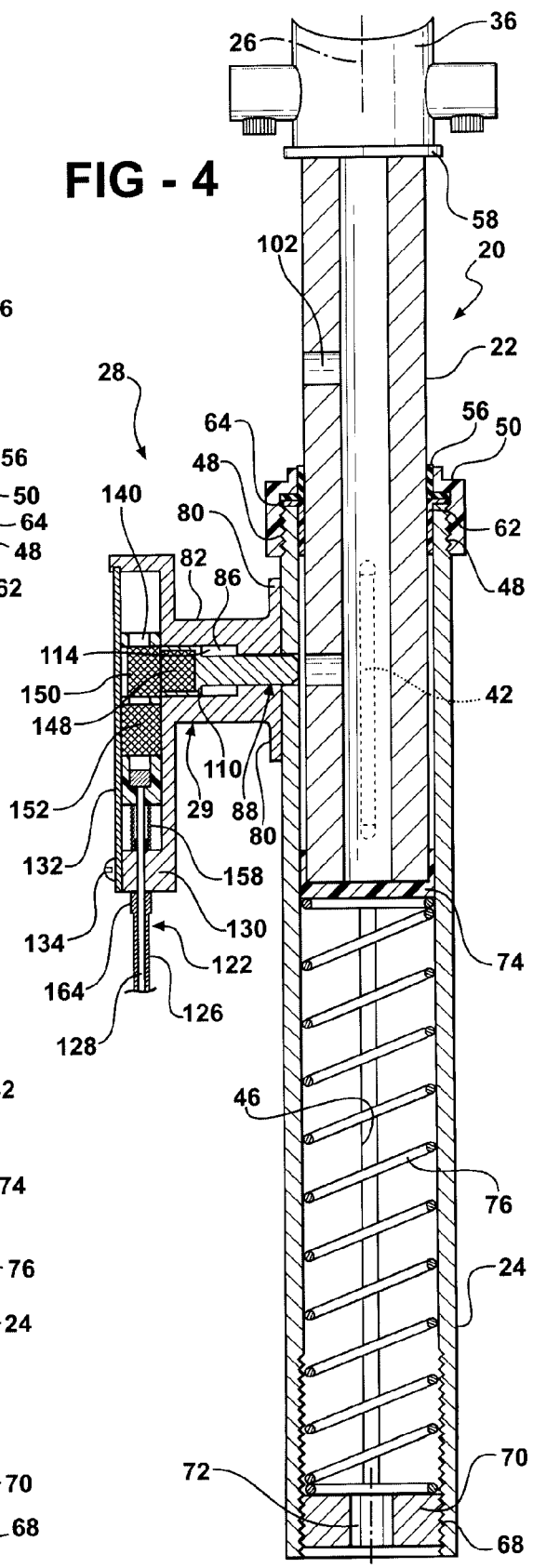

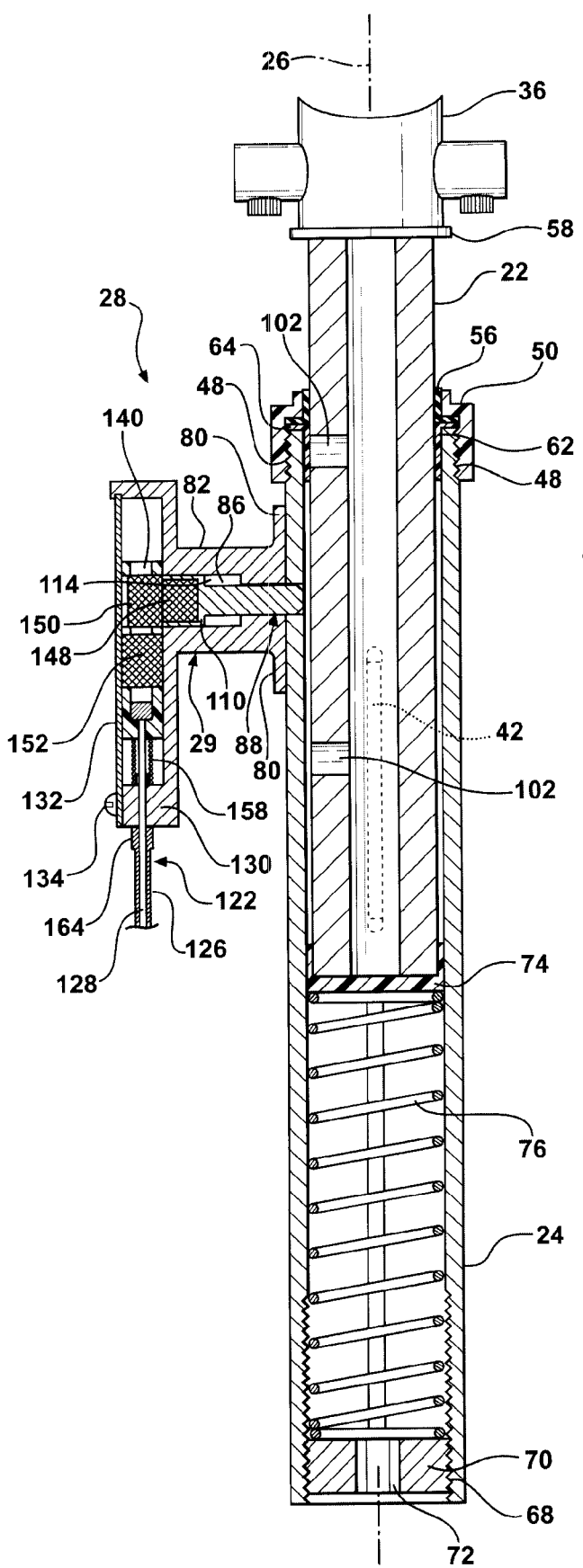
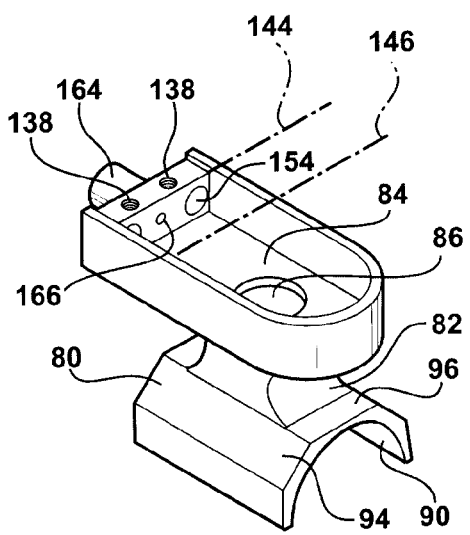
FIG - 5
FIG - 6

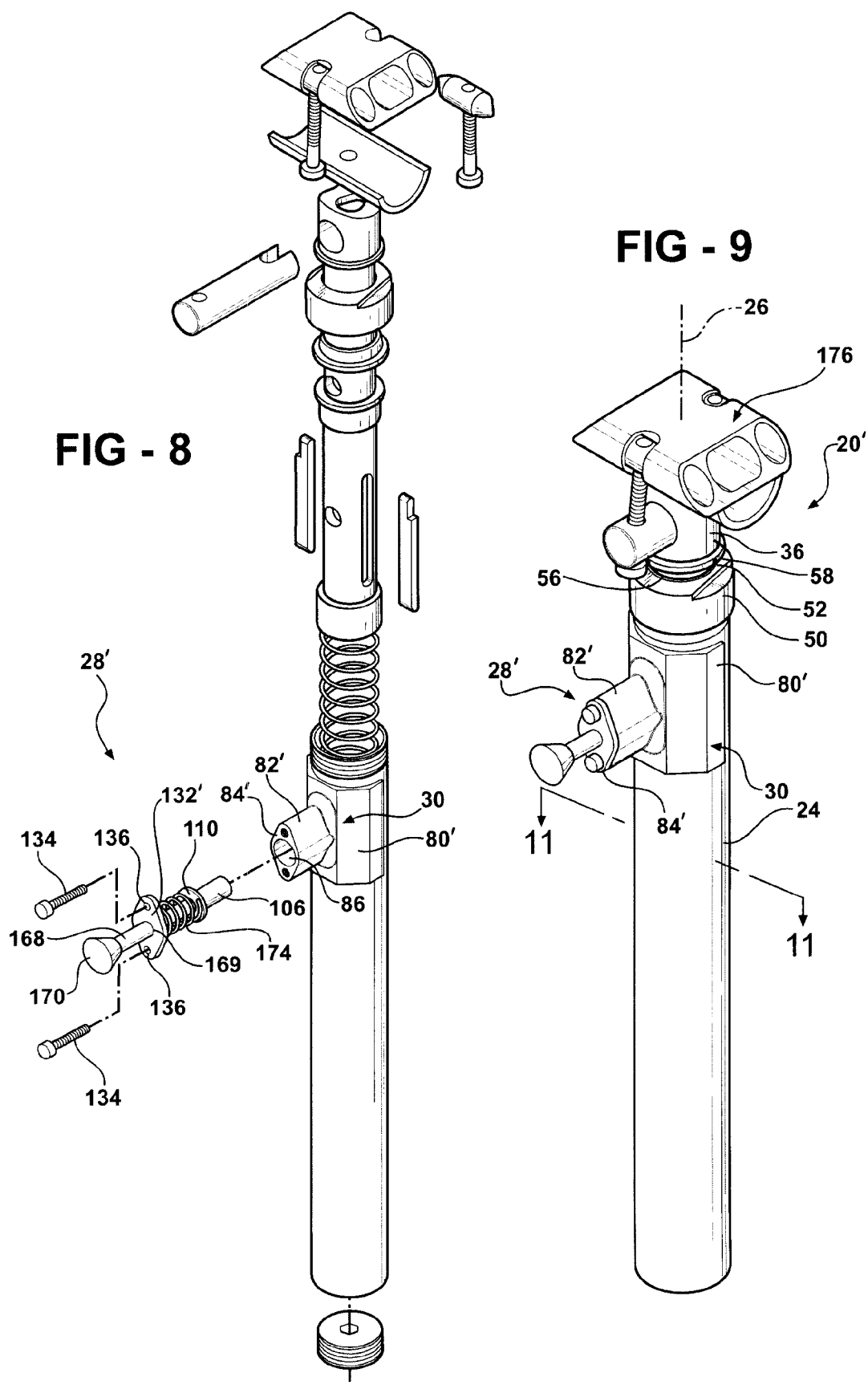

FIG - 10
FIG - 11
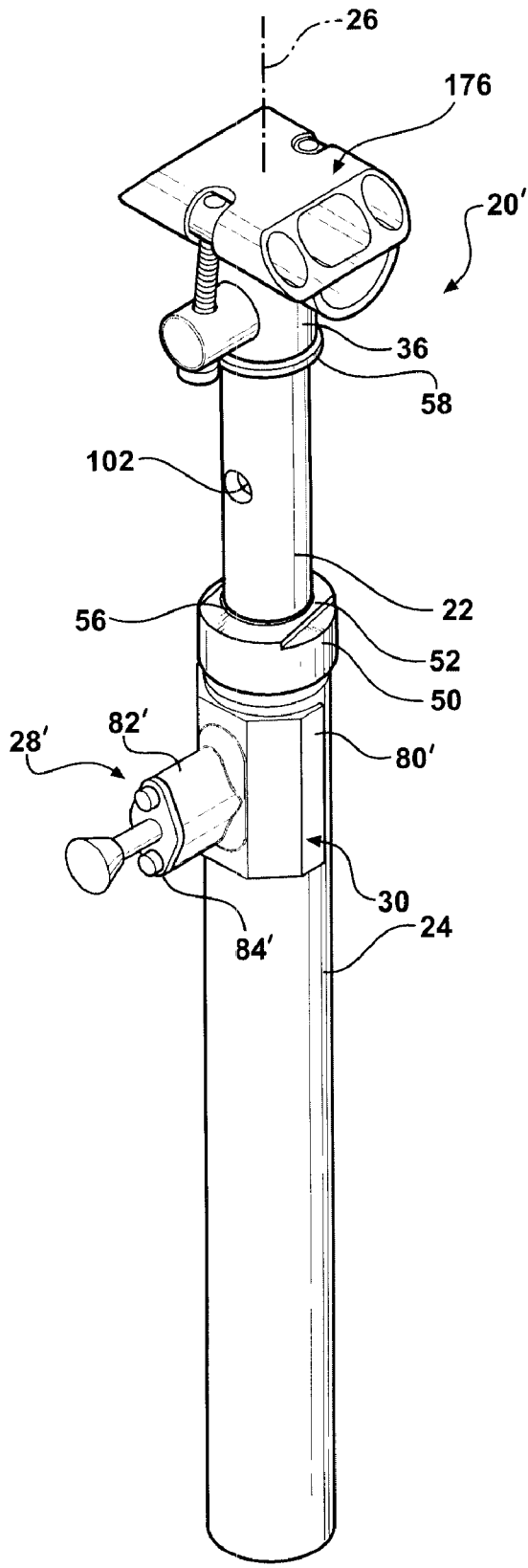
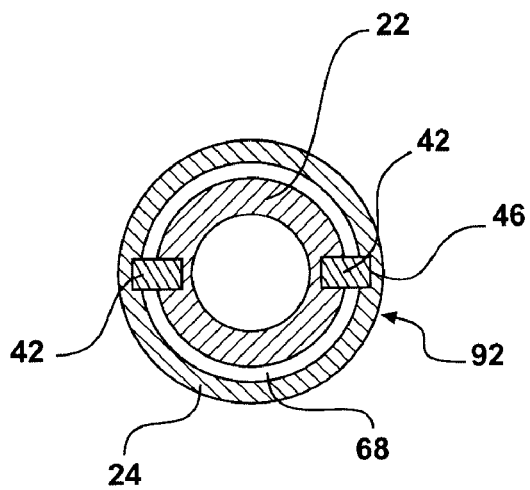

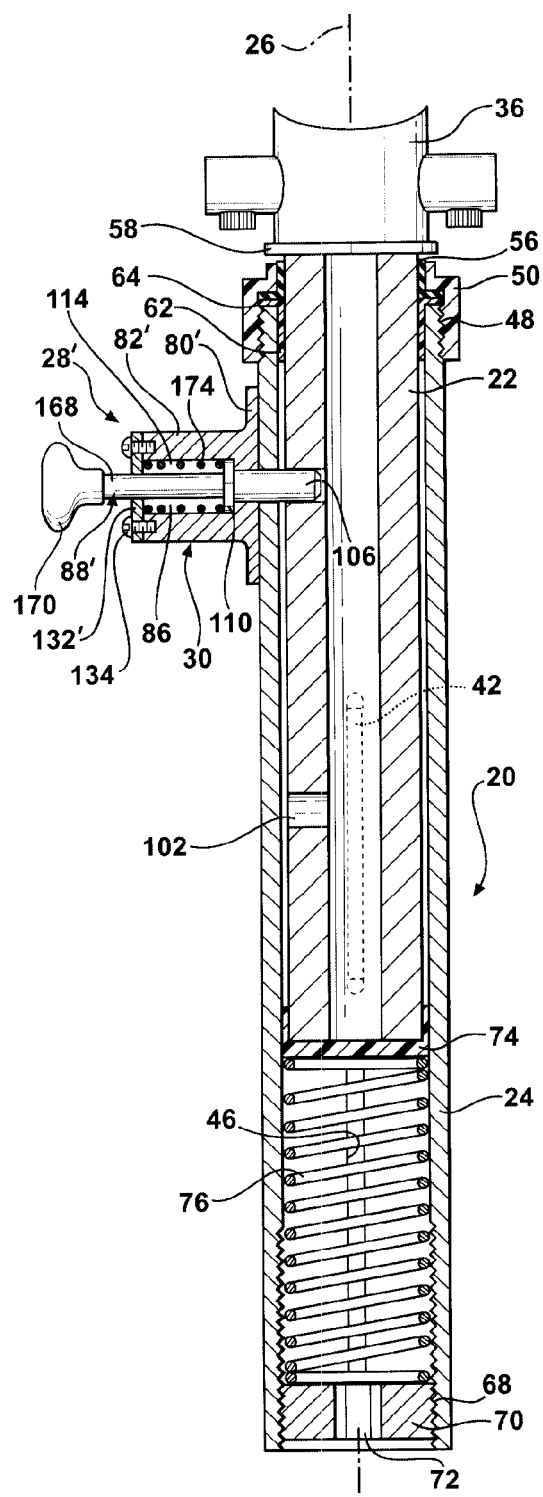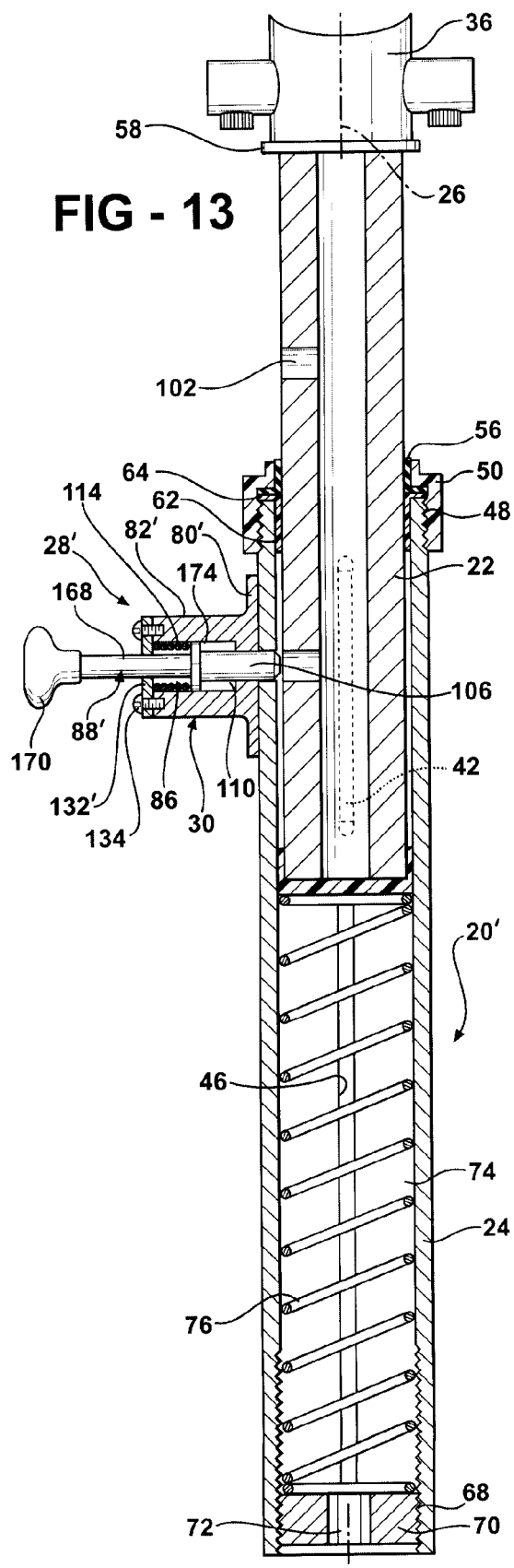

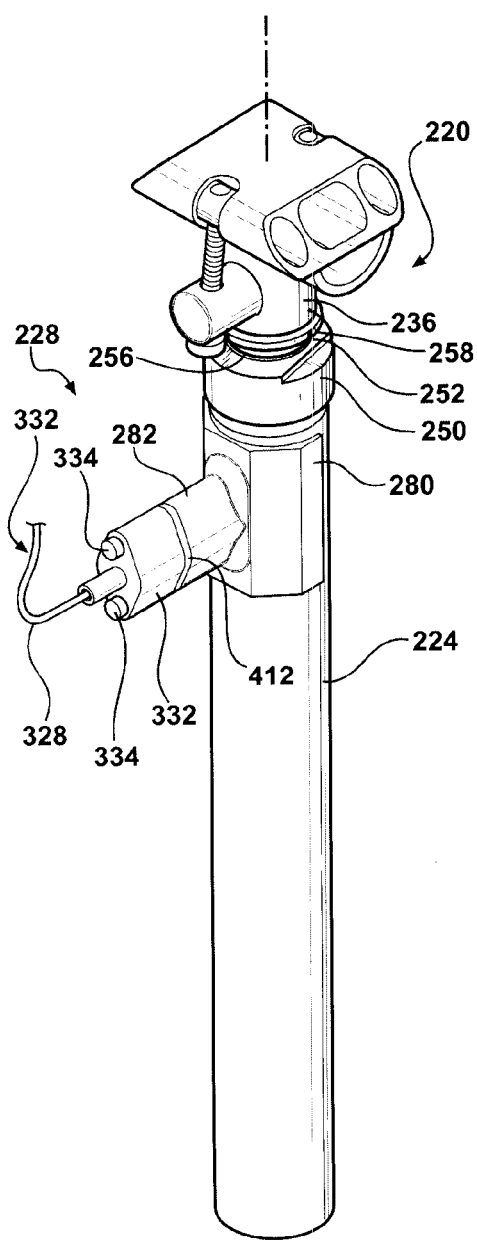
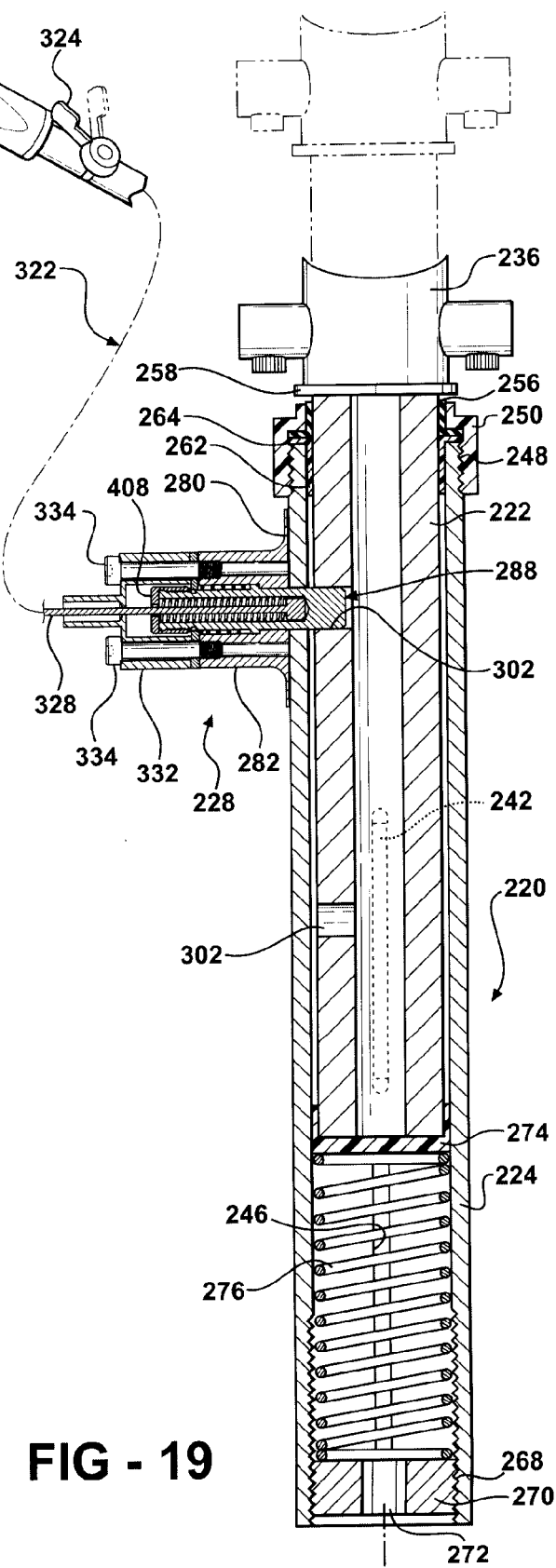
FIG - 18
FIG - 19

ADJUSTABLE BICYCLE SEAT POST ASSEMBLY

RELATED APPLICATIONS

This is a Continuation-In-Part of U.S. application Ser. No. 10/823,464 filed Apr. 13, 2004, now U.S. Pat. No. 7,025,522 B2.

BACKGROUND OF THE INVENTION

1. Field of the Invention

The invention relates generally to adjustable bicycle seat posts and, more particularly, to a telescopic seat post that allows a bicycle seat to be adjusted while the bicycle is being ridden.

2. Related Art

For those engaged in competitive cycling, such as the sport of mountain biking for example, it is sometimes advantageous to adjust the position of the body while riding in order to optimize the control and power over the bike. For instance, when descending a steep hill, a rider sometimes will drop back behind the bicycle seat in order to lower the body position and thereby gain more control over the bike. At most other times, such as on flat terrain, it is most advantageous for the rider's body to be positioned high for maximum leg extension in order to achieve optimum pedal power.

Another challenge faced by competitive mountain bikers is that the various components of the bike are subjected to exposure to water, mud, dirt, and other debris which can quickly impair the proper operation of various moving parts. These agents are compounded by the extreme stresses imposed on bicycle components during competitive use.

In many bike riding situations, but especially in competitive cross-country events, lowering a rider's center of gravity for steep descents and then returning to a raised, pedal stroke condition is extremely important for handling, speed, and safety. In cross-country riding applications in particular, many riders position their seats in a permanent position much higher than do riders of free-style or even downhill racing. This is done because a higher seat position allows for well-developed pedal strokes needed to sustain power to the pedals. Some other cross-country riders will fix their seat in a permanent position below an optimal pedal power position as a compromise between climbing and descending advantages.

Various adjustable-height bicycle seat posts have been proposed which enable a user to vary the height of the seat between two or more positions while riding. The posts are typically in the form of a telescoping tube structure mounted at its lower end to the bicycle frame and which carries a seat at its upper end. Some form of a locking or clamping mechanism is provided which selectively locks the tubes in one of two or more positions. In some cases, a spring is provided which acts to constantly bias the seat toward an extended, or raised, condition.

Most prior art adjustable-height bicycle seat post constructions operate on the principle of inserting a latch pin through aligned holes in the telescoping tube structures. The latch pin is actuated by deploying or throwing some kind of actuator. Sometimes, the actuator is a simple pull knob connected directly to the latch pin, and in other situations, the actuator may be a thumb switch or other control device located remotely from the latch pin and connected through a flexible motion transmitting cable. When a rider is seated on the bicycle seat, his or her body weight creates a large shearing force between the telescoping tube structures. This shearing force is resisted by the latch pin.

When the bicycle rider desires to adjust the position of the seat, he or she actuates the mechanism to withdraw the latch pin from the aligned holes in the telescoping tubes and simultaneously lifts his or her body weight off of the seat in order to decrease the shearing force and allow the latch pin to be extracted from the aligned holes. The timing of this maneuver is critical. If the rider's weight is not lifted at the same time as the latch pin is being extracted from the holes, the latch pin will become trapped in position. This can distract the rider and potentially break the actuator, cable mechanism, or other components in the latch mechanism. Accordingly, riders which user a prior art style seat adjustment mechanism must precisely time deployment of the actuator together with the step of lifting their body weight off of the seat. As will be appreciated, in competitive racing or difficult terrain situations, this methodically timed sequence of events is an unwelcome distraction.

Accordingly, there is a need for an improved adjustable bicycle seat post assembly which does not require the bicycle rider to precisely time deployment of an actuator together with the change in seat height.

SUMMARY OF THE INVENTION AND ADVANTAGES

The subject invention overcomes the shortcomings and disadvantages of the prior art by providing an adjustable height bicycle seat post assembly comprising an outer seat tube and an inner seat post telescopically slidably received in the outer seat tube for moving a bicycle seat between raised and lowered conditions. A latch member is movable between an unlatched position in which the outer seat tube and the inner seat post are freely telescopically slidable relative to one another and a latched position in which the inner seat post is fixed in one of at least two height-adjusted positions relative to the outer seat tube. A remote actuator is selectively movable between actuated and unactuated positions. A flexible motion transmitting cable operatively connects the remote actuator and the latch member for moving the latch member toward its unlatched position in response to movement of the remote actuator toward its actuated position. A lost motion coupling is provided for functionally decoupling the remote actuator from the latch member in response to a dominant shearing load between the inner seat post and the outer seat tube, effectively trapping the latch member in the latched position. The lost motion coupling automatically recouples the remote actuator to the latch member when the dominant shearing load falls below a predetermined limit, such as when a rider lifts their body weight off the seat. The lost motion coupling of the subject invention enables the remote actuator to be moved to its actuated position while the latch remains trapped in the latched position without damaging the cable. The subject lost motion coupling also permits an operator to deploy the remote actuator at any convenient time prior to a desired change in seat height.

Accordingly, the lost motion coupling allows a bicycle rider or operator to throw the remote actuator at any convenient time before the actual change in seat height is desired. And then, by decreasing the shearing load which has the latch member trapped in its latched position, the latch member will automatically move to its unlatched position, thereby allowing the outer seat tube and inner seat post to telescopically slide relative to one another and toward another adjusted seat height position. Hence, a bicycle rider can deploy the remote actuator at any convenient time and then delay the actual change in the seat height until a precisely opportune moment. By disassociating the time at which the remote actuator is deployed from the time at which the seat height is adjusted, a bicycle rider can concentrate more intently on the riding situation. This will result in better handling, improved speed, and a heightened degree of safety for the rider.

According to another aspect of the subject invention, a bicycle assembly having an on-the-fly, adjustable-height seat is provided. The bicycle assembly comprises a frame, at least two wheels rotatably supported in the frame for rolling engagement with the ground, a handlebar moveably supported in the frame and steerably connected to at least one of the wheels, and a seat for supporting a rider. An outer seat tube and an inner seat post are telescopically movable relative to one another between fully retracted and fully extended positions. One of the inner seat post and the outer seat tube are connected to the seat and movable therewith. A latch member is moveable between an unlatched position in which the outer seat tube and the inner seat post are freely telescopically slidable relative to one another and a latched position in which the inner seat post is fixed in one of at least two height-adjusted positions relative to the outer seat tube. A remote actuator is disposed on the handlebar and selectively moveable between actuated and unactuated positions. A flexible motion transmitting cable operatively connects the remote actuator and the latch member for moving the latch member toward its unlatched position in response to movement of the actuator toward its actuated position. A lost motion coupling is provided for functionally decoupling the remote actuator from the latch member in response to a dominant shearing load between the inner seat post and the outer seat tube, trapping the latch member in the latched position. The lost motion coupling automatically recouples the remote actuator to the latch member when the dominant shearing load falls below a predetermined limit. The lost motion coupling enables the remote actuator to be moved to its actuated position while the latch remains trapped in its latched position without damaging the cable. The lost motion coupling also permits an operator to deploy the remote actuator at any convenient time prior to a desired change in seat height.

According to yet another aspect of the subject invention, a method is provided for selectively moving a bicycle seat between at least two positions of height adjustment while the bicycle is being ridden. The method comprises the steps of: providing a bicycle having a seat, providing an adjustable seat post support comprising upper and lower telescopic members, supporting the seat on the upper member for sliding movement between at least two height-adjusted positions, providing a latch member moveable between an unlatched position in which the upper and lower members are freely telescopically moveable relative to one another, and a latched position in which the upper and lower members are locked relative to one another. The method further includes the step of providing a remote actuator moveable between actuated and unactuated positions, urging the latch member toward the unlatched position in response to movement of the remote actuator toward the actuated position, and trapping the latch member in the latched position by applying a dominant shearing load between the upper and lower members. The method is characterized by moving the remote actuator completely to its actuated position while the latch remains trapped in its latched position and then automatically withdrawing the latch member toward its unlatched position in response to a decrease in the shear loading between the upper and lower members.

A seat post assembly, bicycle, and method according to the subject invention overcomes the shortcomings and disadvantages exhibited by prior art seat post configurations, and thereby results in substantially enhanced bicycle riding experiences which contribute to better handling, improved speed, and greater rider safety.

BRIEF DESCRIPTION OF THE DRAWINGS

These and other features and advantages of the present invention will become more readily appreciated when considered in connection with the following detailed description and appended drawings, wherein:

FIG. 3 is an enlarged cross-sectional view of the assembly shown in the lowered position;

FIG. 4 is a view like FIG. 3, but shown in the raised position;

FIG. 5 is a view like FIGS. 3 and 4, but shown in an intermediate position;

FIG. 6 is a perspective view of the locking mechanism housing;

FIG. 8 is an exploded perspective view of an assembly according to a second embodiment of the invention;

FIG. 9 is a perspective view of the assembly of FIG. 8 shown in a lowered position;

FIG. 10 is a view like FIG. 9, but shown in the raised position;

FIG. 11 is a sectional view taken generally along lines 11-11 of FIG. 9;

FIG. 12 is an enlarged cross-sectional view of the assembly of FIG. 9;

FIG. 13 is a view like FIG. 12, but shown in the raised position;

FIG. 18 is a perspective view of the assembly of FIG. 17 shown in a lowered position;

FIG. 19 is a cross-sectional view of the assembly of FIG. 18;

DETAILED DESCRIPTION OF THE PREFERRED EMBODIMENT

Referring to the figures, wherein like numerals indicate like parts throughout the several views, an adjustable bicycle seat assembly is shown generally at 20.

Figure 1:
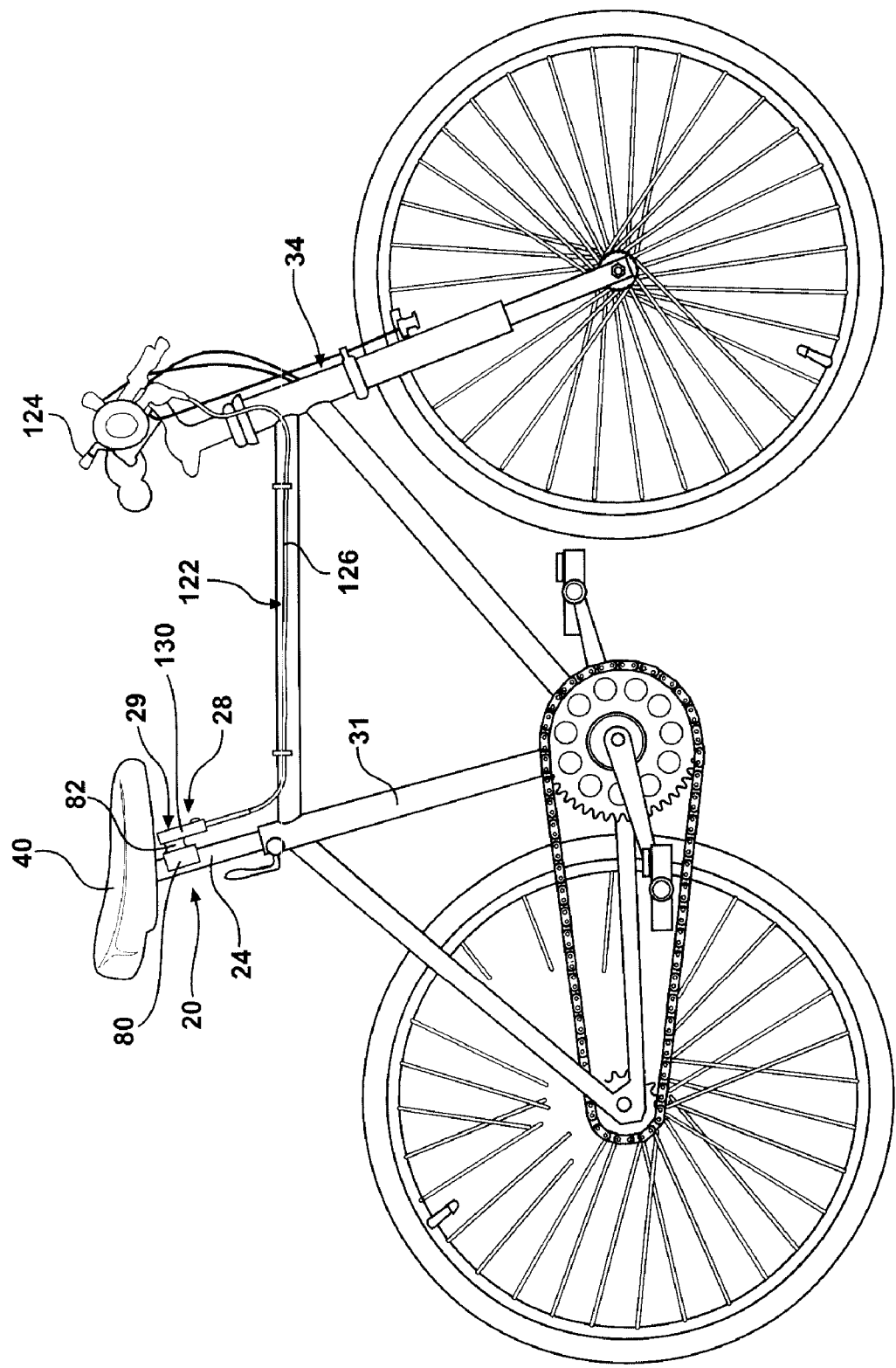
FIG. 1 is a schematic view of a bicycle having the adjustable seat post mounted thereon.

Referring now to FIG. 1, the seat post assembly 20 comprises a hollow inner seat post or tube 22 that slides inside a hollow outer tube 24 along a longitudinal axis 26 and a locking mechanism 28 interconnecting the post 22 in various adjustable positions relative to the tube 24. The locking mechanism 28 may be manipulated through various means to engage or release the post 22, as described in more detail below. There are two alternative representative embodiments of locking assemblies according to the invention; one remote actuated magnetic switch assembly 29, as shown in FIGS. 1-7, and the other a manual release assembly 30, as shown in FIGS. 8-16. Their respective constructions and operations will be described below.

Preferably, the outer tube 24 is fabricated of a lightweight corrosion-resistant metal having thin walls, and the post 22 is composed of a lightweight metal having thicker walls than that of the outer tube 24. The preferred material for the inner and outer tubes 22, 24 is aluminum or an aluminum alloy, although the invention is not to be limited by these materials.

Referring now additionally to FIGS. 2-5, the outer tube 24 is configured at its lower end to be slidably received in a conventional seat post receptacle in the frame 31 of a bicycle 34 in the usual manner of a conventional, single-tube bicycle seat post 22. The opposite upper end of the inner tube 22 is fitted with a bracket 36 suitable for mounting a bicycle seat or saddle 40 to support the weight of a rider.

Figure 2:
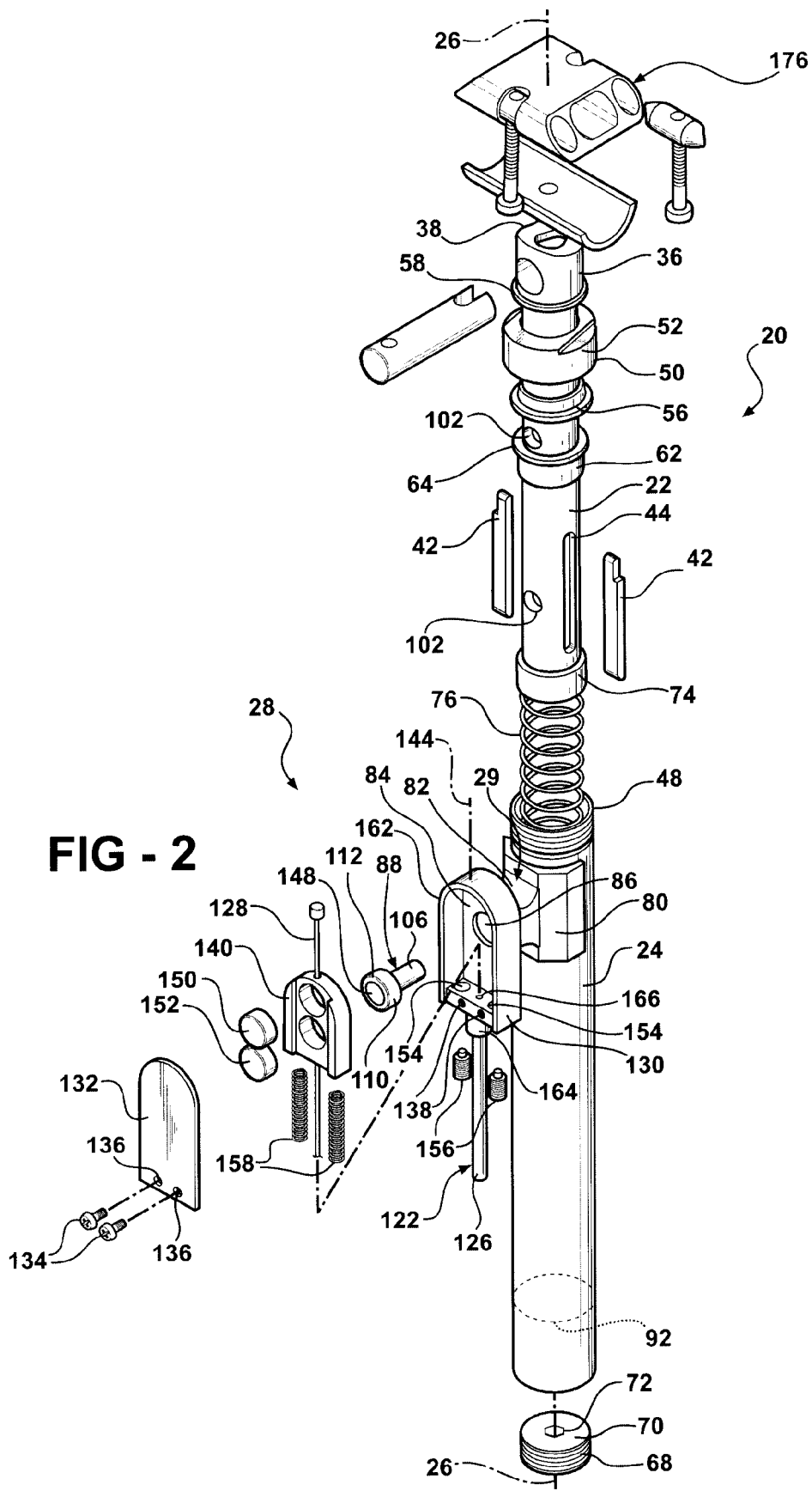
FIG. 2 is an exploded view of a first embodiment of the adjustable seat post assembly.

As best shown in FIGS. 2 and 11, a pair of shims 42, preferably fabricated of plastic, are removably inserted into notches 44 on the inner post 22 to glide in vertical grooves 46 located inside the outer tube 24 along the longitudinal axis 26. The shims 42 allow the post 22 to move up or down relative to the outer tube 24, but support the inner post 22 against rotational movement relative to the outer tube 24. After a period of use and wear, the plastic shims 42 may be inexpensively replaced to prolong the life-span of the bicycle seat assembly 20.

A top ring cap 50 is carried about an extended portion of the inner post 22 that extends above the outer tube 24 and is threadable onto the outside of the upper end of the outer tube 24 to provide a serviceable connection between the tubes 22, 24 that prevents them from separating from one another during normal use, but yet enables a user to dissemble the tubes in order to clean the interior or replace worn or broken components as the need arises. The ring cap 50 forms a water and debris-tight seal with the outer tube 24 and, further, has a hole 52 through which the post 22 extends, presenting an annular wiping lip that rides against the inner post 22 and which preferable provides a water and debris-resistant ring seal about the relatively slidable inner post 22 to discourage the entry into the inner tube 24. Preferably, the top ring cap 50 is fabricated of a lightweight plastics material, such as nylon or the like. An O-ring seal 56 is also preferably disposed about the post 22 below the top cap 50 to enhance the sealing characteristics of the top ring cap 50.

A seat clamp collar 58 integral with the post 22 is located at the bottom of the seat clamp mount 36 and defines a collar diameter greater than the diameter of the top cap central hole 52. The collar 36 defines a stop surface or shoulder for the inner post 22, which confronts the top ring cap 50 when the inner post is in a fully distended or retracted position. The top ring cap 50 thus serves to not only couple the inner and outer tubes 22, 24, but to limit their travel to define fully extended and retracted positions of the tubes 22, 24. Additionally, a bushing or sleeve 62, which is preferably fabricated of a plastics material such as nylon or the like, is disposed about the post 22 between the shims 42 and top cap 50. A body of the sleeve 62 extends into the outer tube 24 through its open top and serves as a bearing to take up the annular operating clearance between the inner and outer tubes 22, 24. A top flange 64 of the sleeve 62 is captured between the top ring cap 50 and the top end of the outer tube 24 to support the sleeve 62 in position. When in the fully extended position, the shims 42 of the inner post 22 preferably contact the body of the sleeve 62 to effectively limit the outward travel of the inner post 22 relative to the outer tube 24. The sleeve 62 is readily removable from the outer tube 22 during disassembly to accommodate cleaning and/or servicing of the assembly as needed.

The bottom end of the outer tube 24 is open and is closed by a removable end cap 70. Preferably, the lower end of the outer tube 24 is internally threaded and the end cap 70 is externally threaded. The end cap 70 is threaded into the outer tube 24 to close the lower end, but yet the end cap 70 remains separable to allow access to the bottom of the post 22. The bottom cap nut 70 is preferably fabricated of a lightweight metal compatible with that of the outer tube material to minimize corrosion, such as aluminum or aluminum alloys, and includes a hex-shaped tool-receiving recess 72 for receiving a wrench for tightening and loosening the end cap 70. The end cap 70 supports the lower end of a main compression spring 76 housed within the outer tube 24. The upper end of the spring 76 abuts a shoulder or collar 74 provided on the inner post 22 adjacent its lower end. The spring 76 acts in compression between the end cap 70 and the shoulder 74 to exert a recoil spring force that constantly urges the inner post 22 longitudinally outwardly of the outer tube 24 toward the fully extended position. The main spring 76 force (spring rate) can be adjusted by threading the bottom cap nut 70 toward or away from the shoulder 74.

Figure 7:
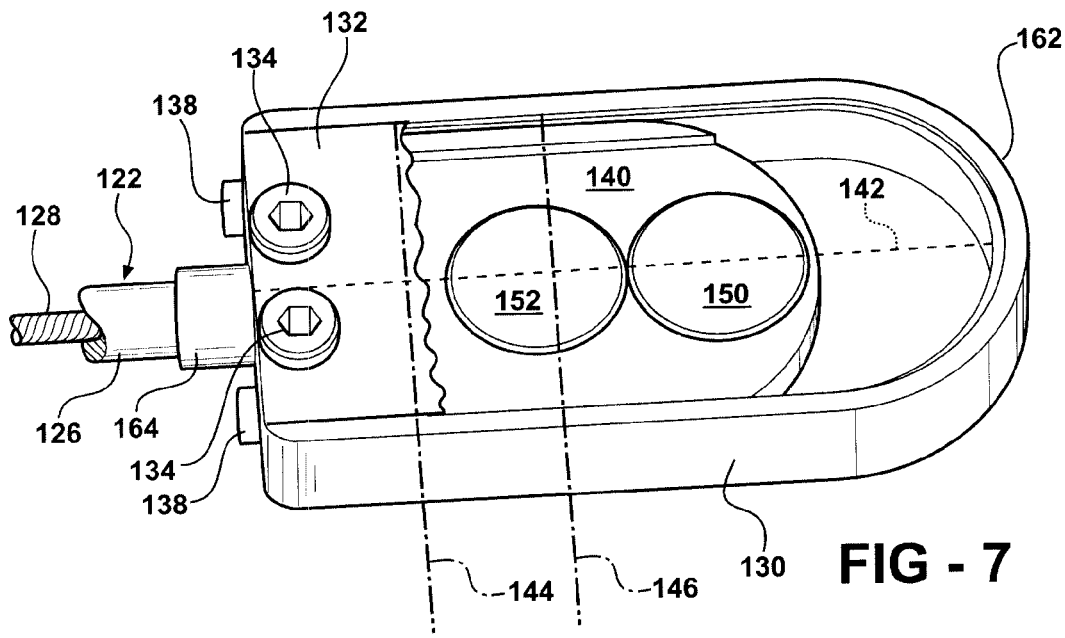
FIG. 7 is an enlarged fragmentary perspective view of the magnetic latch mechanism.
Figure 14:
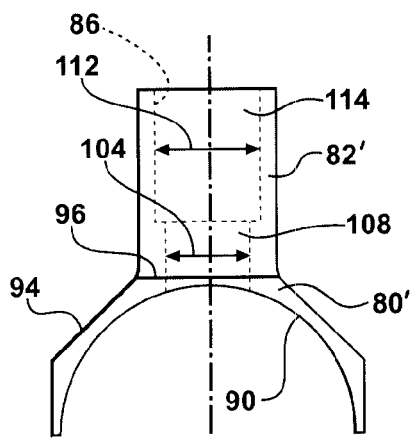
FIG. 14 is a side view of the latch housing.
Figure 15:
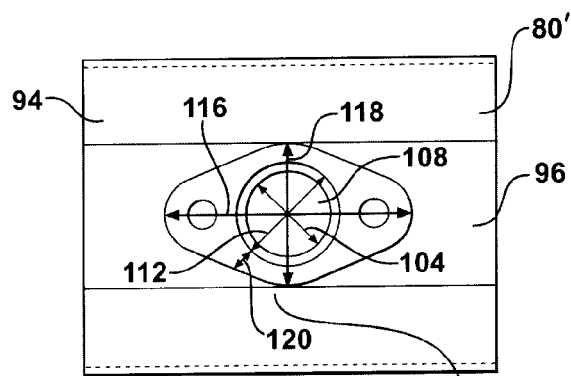
FIG. 15 is a plan view of the latch housing.
Figure 16:
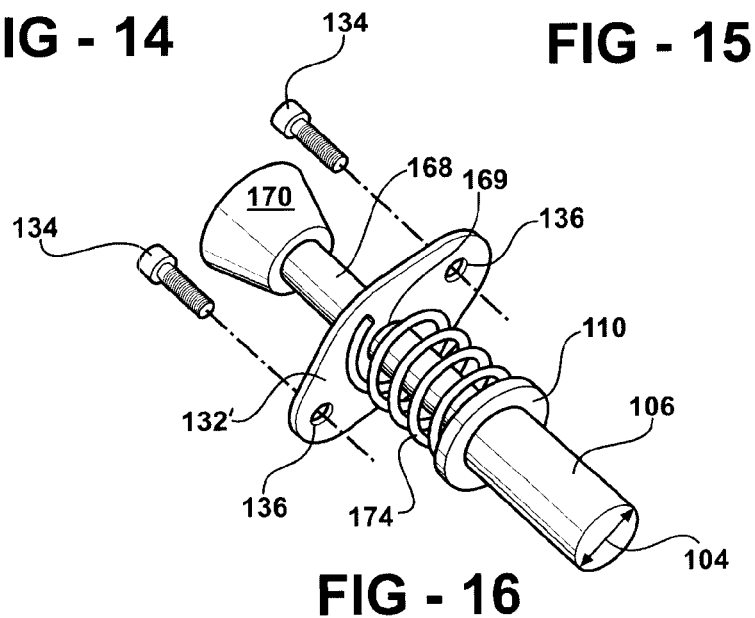
FIG. 16 is a partially exploded perspective view of the manual latch mechanism.
Figure 17:
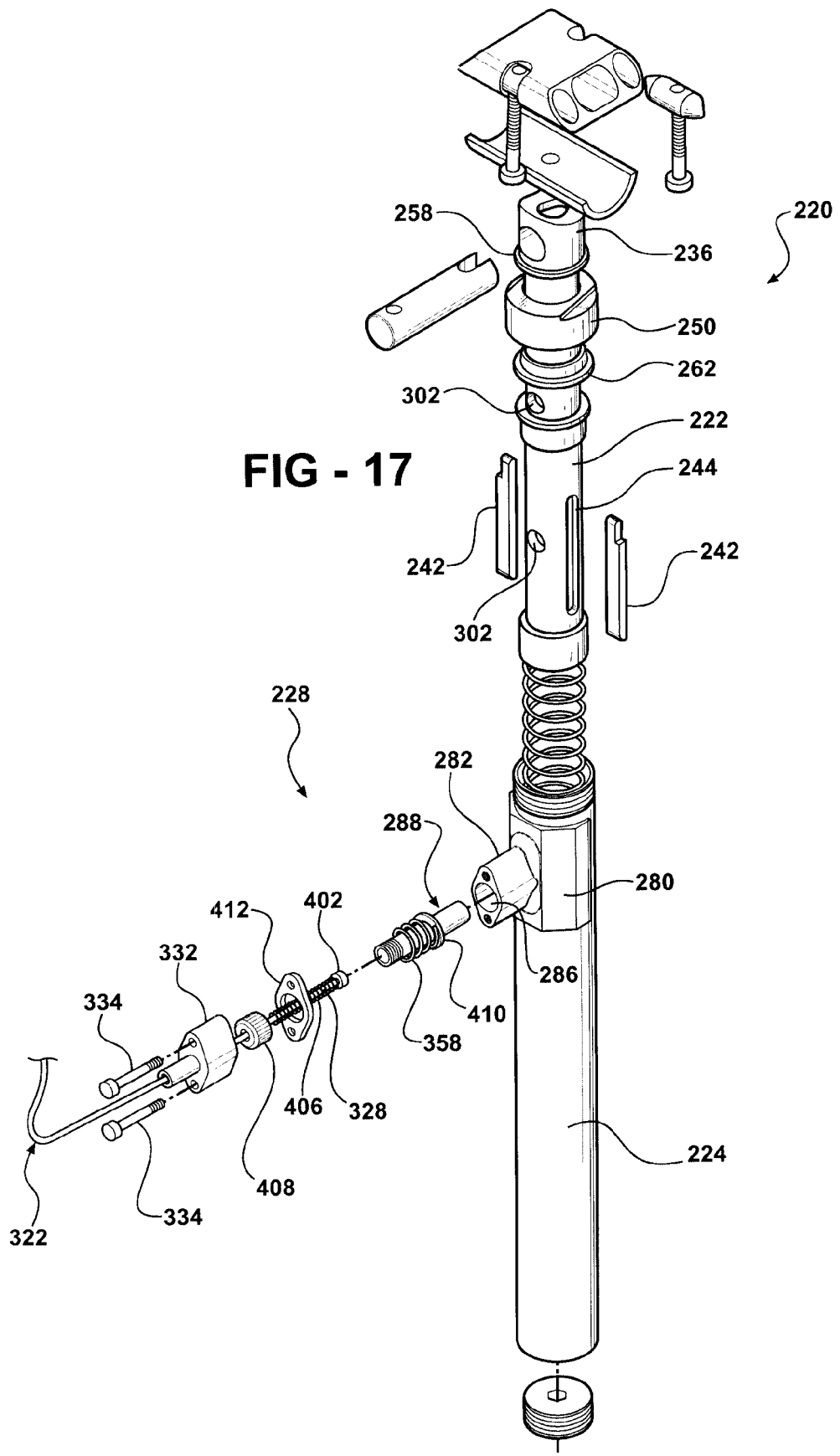
FIG. 17 is an exploded perspective view of an assembly according to a third embodiment of the invention.

Referring now to FIGS. 6 and 7, the locking mechanism 28 includes a foundation or housing 80 disposed on the outside of the tube 24 and a projection portion 82 integral with the foundation 80 extending radially from the longitudinal axis 26 to a distal end 84. A counterbore 86 defined in the projection 82 extends perpendicularly to the longitudinal axis 26 and slidably supports a locking pin or plunger 88.

The foundation 80 includes a concave part-cylindrical bottom surface 90 corresponding in size and shape to the outer surface 92 of the outer tube 24. The bottom surface 90 extends less than 180 degrees about the circumference 92 of the tube 24, allowing the bottom surface 90 to be pressed against the outer tube 24 and adhesively secured. The foundation 80 also includes an outer surface 94 opposite to the bottom surface 90. This outer surface 94 includes at least one flat outer surface 96 extending tangentially to the circular bottom surface 90. A cross section of this outer surface 94 preferably defines a polygon segment of flat surfaces, such as one half of an octagon as shown in FIG. 6. Preferably, the projection 82 extends laterally from a centrally located flat surface 96 on the foundation 80.

A plurality of holes 102 located on the post 22 have a force-bearing diameter 104 for receiving the plunger 88 and holding the post 22 in a fixed position relative to the hollow tube 24. The plunger 88 has a force-bearing section 106 that is slidably supported by a force-bearing length 108 of counterbore 86 within the projection 82 and foundation 80. This force-bearing section 106 of plunger 88 is fully supported along the entire force-bearing length 108 of counterbore 86 when the plunger 88 engages the holes 102 in the post 22. In addition to the force-bearing section 106, the plunger 88 includes a disk 110 extending radially from the plunger 88. The disk 110 has a disk diameter 112 greater than the force-bearing diameter 104 and is slidably supported inside the counterbore 86 by a disk-bearing length 114 of counterbore 86.

The projection 82 defines a height 116 along the longitudinal axis 26 and a width 118 perpendicular to the height 116.

Preferably, the height 116 is greater than the width 118. The projection 82 also defines a wall thickness 120 surrounding the counterbore 86. Preferably, the wall thickness 120 is greater in the direction of the height 116 than in the direction of the width 118, making the projection 82 strongest along the longitudinal axis 26 to bear the shearing forces on the plunger 88, while keeping the projection 82 dimensions small.

In the remote controlled magnetic switch assembly 29 shown in FIGS. 1-7, the plunger 88 is preferably manipulated via a pull-pull or push-pull style of flexible motion transmitting cable 122 connected to a remote actuator, such as the illustrated thumbswitch 124. The cable 122 is of the type commonly used in bicycles, with either a partial or full length outer sheath 126 that movably supports an inner control cable 128. A housing 130 is integral with the distal end 84 of the projection 82 and covered by a main unit endcap 132. The endcap 132 is secured to the housing 130 by two cap screws 134 that extend through endcap holes 136 in the endcap 132 and thread into cap screw holes 138 in the projection 82.

A slider bar or slider shoe 140 is disposed in the housing 130, below the endcap 132 and above the plunger 88, for sliding movement inside the housing 130 along a slider axis 142 between a first position 144 and a second position 126. The disk 110 section of the plunger 88 includes a plunger magnet 148 having a plunger magnetic polarity facing the slider bar 140. The slider bar 140 includes an attracting magnet 150 having an attracting magnetic polarity opposite to the plunger magnetic polarity. The attracting magnet 150 is embedded in the slider bar 140 to be centered over the plunger magnet 148 when the slider bar 140 is in the first position 144, thereby disengaging the plunger 88 from the post 22 when the slider bar 140 is in the first position 144. Preferably, the first position 144 is defined when the slider bar's motion along the slider axis 142 is checked by contact with the housing 130. The slider bar 140 also includes a repelling magnet 152 having a repelling magnetic polarity matching the plunger magnetic polarity. The repelling magnet 152 is embedded in the slider bar 140 to be centered over the plunger magnet 148 when the slider bar 140 is in the second position 126, thereby engaging the plunger 88 with the post 22 when the slider bar 140 is in the second position 126. Preferably, the second position 126 is defined when the slider bar's motion along the slider axis 142 is checked by contact with the housing 130 at the end of the slider axis 142 opposite to the first position 144.

The housing 130 includes a pair of threaded screw holes 154 in the direction of the slider axis 142 and tension set screws 156 threaded into these screw holes 154. A pair of slider bar springs 158 fit into a pair of spring holes 160 disposed on the slider bar 140 and mesh with the tension set screws 156 in the housing 130. The slider bar springs 158 force the slider bar 140 into the second position 126. Additionally, the housing 130 and slider bar 140 have a rounded shape 162 opposite to the slider bar springs 158 to ensure that the slider bar 140 rests snugly when forced into the second position 126 by the slider bar springs 158.

A cable mount 164 disposed outside the housing 130 holds the cable's 122 outer sheath 126 against the housing 130 in a fixed position. The cable mount 164 is located on the same side of the housing 130 as the tension set screws 156 along the slider axis 142, and the cable 122 extends parallel to the longitudinal axis 26 near the cable mount 164. The inner control cable 128 extends through a cable hole 166 in the housing 130 and connects to the slider bar 140 for moving the slider bar 140 in proportion to the pressure applied to the thumbswitch 124. In this first embodiment, the thumbswitch 124 counteracts the force of the tension set screws 156 to move the slider bar 140 into the first position 144 and disengage the plunger 88 from the post 22. When the thumbswitch 124 is released, the slider bar 140 moves to the second position 126 and engages the plunger ii with the post 22.

In the manual release assembly 30, the plunger 88 is manually manipulated. Referring to FIGS. 8-16, a knob supporting section 168 of plunger 88 extends from the disk 110 and has a diameter less than the disk 110, so that the disk 110 is located between the force-bearing section 106 and the knob supporting section 168. An endcap 132 is secured to projection 82 by two cap screws 134 that extend through endcap holes 136 in the endcap 132 and thread into cap screw holes 138 in the projection 82. The knob supporting section 168 of the plunger 88 extends through a knob hole 169 in the top cap 50, and a knob 170 is attached to the distal end 84 of the plunger 88 extending outside of the projection 82. A spring 174 disposed about the plunger 88 reacts between the disk 110 and the endcap 132, causing the plunger 88 to engage the post 22 until the knob 170 is pulled away from the tube 24 by manual manipulation.

In both embodiments, a bicycle seat 40 is mounted to the seat post assembly 20 using a seat clamp assembly 176 that attaches to the seat clamp mount 36. The seat post 22 is mounted to a bicycle 34 by attaching the tube 24 to the bicycle 34 in the same manner as an ordinary seat post 22. During this seat mounting process, the seat height 116 relative to the bicycle 34 is adjusted to be in a high position for optimal power, with the post 22 fully extended. After the seat is mounted, manipulation of the plunger 88 to extend or distend the post 22 allows the seat to transition between a high position and a low position while the bicycle 34 is being ridden. During competitive mountain biking, for example, a rider can quickly lower the seat by operating the lever to unlatch the locking pin 88 from the inner post 22 while maintaining sufficient body weight on the seat to overcome the constant upward force of the main spring 76. Once the inner post 22 begins to move downwardly, the rider can release the lever and the pin will drop into the upper-most hole of the inner post 22 to lock the inner post 22 in the lowered position. To return the seat to the fully raised condition, the lever is again actuated to unlatch the pin 88 while the user lifts his body to decrease the counterweight on the seat by an amount sufficient to enable the main spring 76 to raise and return the inner post 22 to the fully raised position.

Referring now to FIGS. 17-22, a third embodiment of the subject invention is depicted which utilizes the remote actuator and control cable feature found in the first embodiment of the invention, together with the combined features existing in all of the previous embodiments. For expediency, components or features of this invention common or corresponding substantially to components or features depicted and described in connection with the preceding embodiments will be described and depicted using the same reference numbers, plus "200." For example, the inner seat post 22 is referenced as 222, the cable assembly 122 is now 322, and so forth. Reference numbers used in the accompanying FIGS. 17-22 and not otherwise described specifically below will find support in the corresponding descriptions hereinabove.

Figure 20:
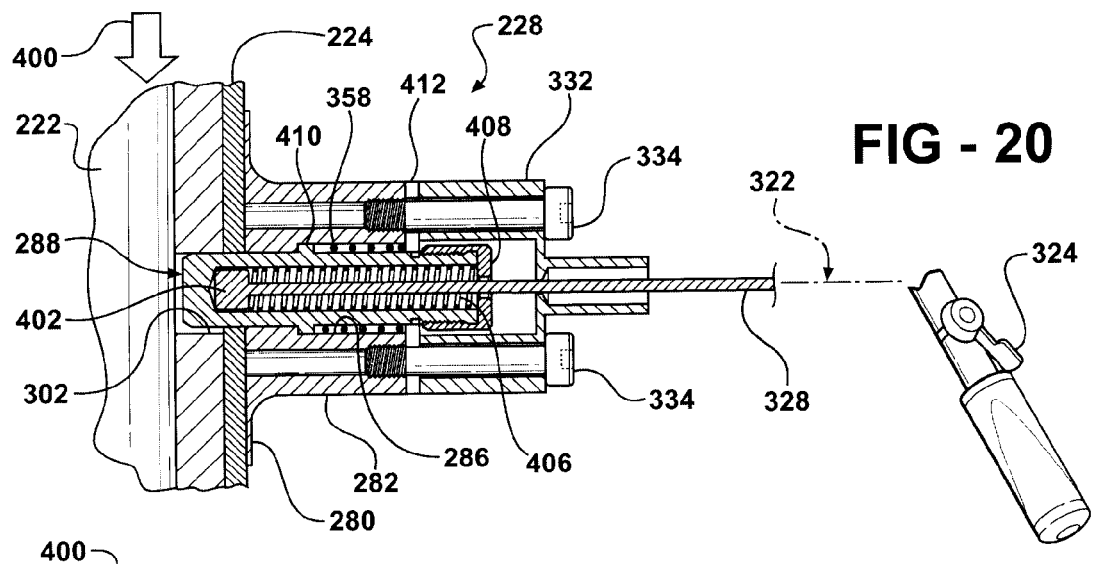
FIG. 20 is a fragmentary cross-sectional view of the third embodiment of the invention showing the latch member in a latched condition and the remote actuator mounted on the handlebar in an unactuated condition.

Accordingly, the adjustable-height bicycle seat post assembly 220 includes an outer seat tube 224 and an inner seat post 222. The inner seat post 222 is telescopically slidably received in the outer seat tube 224 for moving the bicycle seat (not shown, but connected to bracket 236) between raised and lowered conditions. A latch member 228 is movable between an unlatched position (FIG. 22) in which the outer seat tube 224 and the inner seat post 222 are freely telescopically slidable relative to one another, and a latched position (FIG. 20) in which the inner seat post 222 is fixed in one of the at least two height-adjusted positions relative to the outer seat tube 224. A remote actuator 324, which again is shown in the exemplary form of a thumbswitch, is mounted on the bicycle handlebar or in some other convenient location for movement between an actuated position (FIGS. 21 and 22) and an unactuated position (FIG. 20). A flexible motion transmitting cable 328 operably connects the remote actuator 324 and the latch member 228. The cable 328 is effective to move the latch member 228 toward its unlatched position in response to movement of the remote actuator 324 toward its actuated position. Thus, when the remote actuator 324 is deployed (i.e., actuated), the latch member 228 is drawn toward its unlatched position. Conversely, the remote actuator 324 and the latch member 228 both return to their home positions at the same time via the connected relationship through the cable 328.

The third embodiment of the invention, like that of the first embodiment depicted in FIGS. 1-7, includes a lost motion coupling for functionally decoupling the remote actuator 324 from the latch member 228 in response to a dominant shearing load between the inner seat post 222 and the outer seat tube 224. This dominant shearing load can arise from the rider's body weight on the seat 40. It can also arise from a stiff return spring 75, 276, or from another source. Whatever the source, this shearing force can trap the latch member 228 in its latched position, making normal withdrawal through the actuator 324 (i.e., absent the lost motion coupling) difficult or impossible. The lost motion coupling can be located anywhere between the actuator (thumbswitch) 124, 324 and the latch member 28, 228. As one example, the lost motion coupling could be integrated into the remote actuator 124, 324 or along the length of the cable assembly 122, 322. In the case of the first embodiment of the invention depicted in FIGS. 1-7, the lost motion coupling feature is accomplished through the arrangement of magnets in the latch member 28. An all-mechanical arrangement is proposed in connection with the third alternative embodiment of the invention as depicted in FIGS. 17-22. The lost motion coupling in any of its possible forms automatically recouples the remote actuator 124, 324 to the latch member 28, 228 when the dominant shearing load falls below a predetermined limit.

Figure 21:
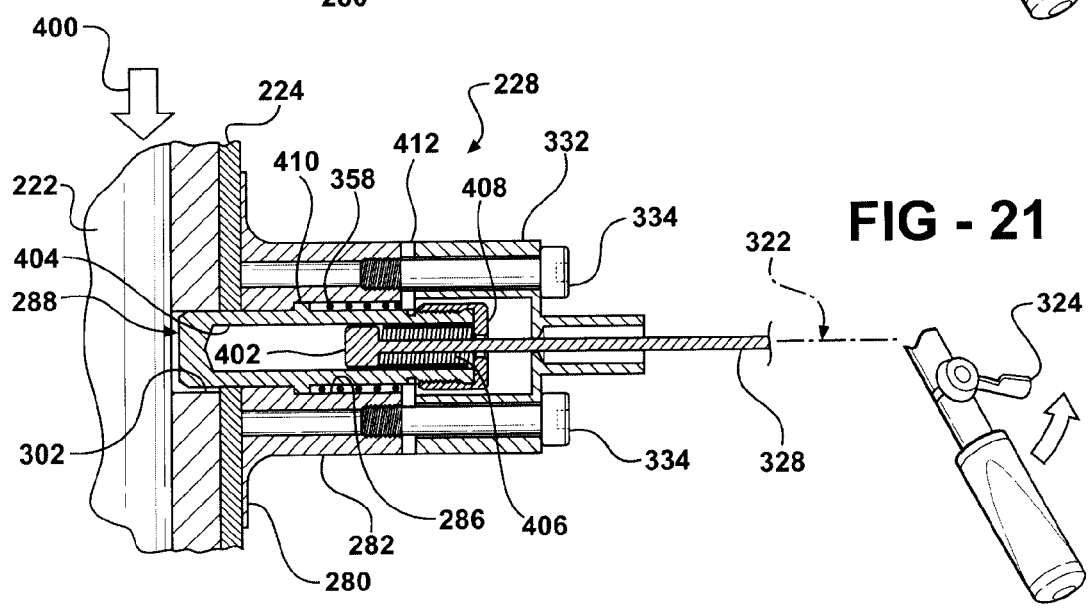
FIG. 21 is a view as in FIG. 20, but showing the latch member trapped in its latched position by a dominant shearing load while the remote actuator has been moved to its fully actuated position.
Figure 22:
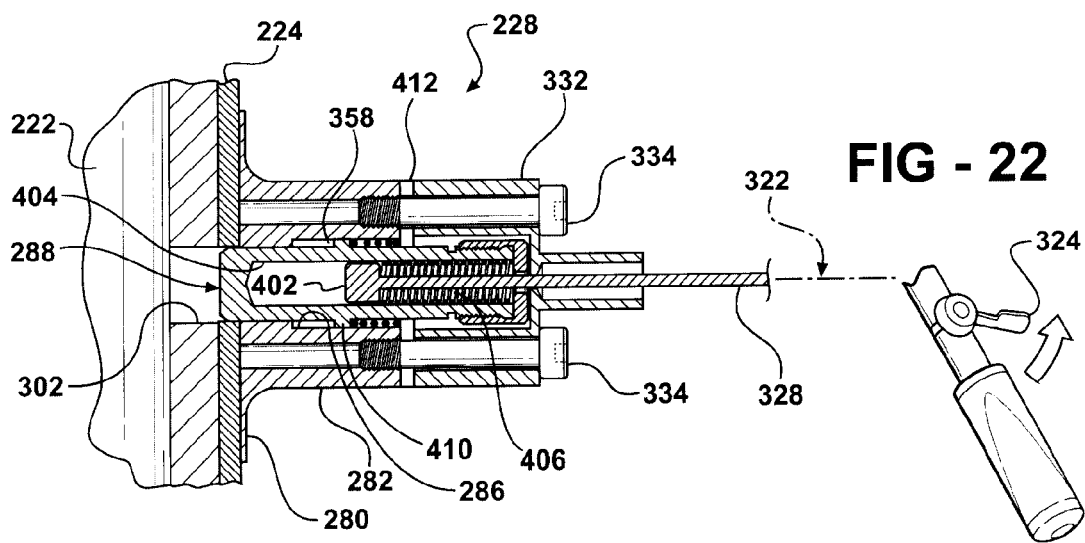
FIG. 22 is a view as in FIG. 21, but showing the latch member automatically withdrawn toward its unlatched position in response to a decrease in the shear loading between the inner seat post and the outer seat tube.

Referring to FIGS. 20 and 21, the dominant shearing load is depicted by force arrow 400. Typically, this dominant shearing load 400 is created by the weight of the rider acting through gravity on the inner seat post 222. When an operator deploys the remote actuator 324 by moving the thumbswitch toward the actuated position, as shown in FIG. 21, the cable 328 is displaced a proportional distance. However, because the latch member 228 is trapped by the dominant shearing force 400, it is prevented from moving. In this situation, the lost motion coupling allows the remote actuator 324 to move fully into its actuated position while the latch member 228 remains trapped in its latched position. One particular advantage of the lost motion coupling is to protect the cable 328 from being damaged by over stress or excess tension. Furthermore, this lost motion coupling permits the operator to deploy the remote actuator 324 at any convenient time prior to a desired change in seat height. Thus, if an operator knows that a change in seat height will be required in the near future, and it is presently an opportune time to deploy the remote actuator 324, the operator may do so even though his or her body weight (or some other source) continues to trap the latch member 228 in the latched condition. The operator can maintain the remote actuator 324 in the actuated (deployed) condition without damaging the cable 328. As soon as the rider lifts his or her weight off the bicycle seat (or otherwise counteracts the source of the force), thereby decreasing the shear loading 400 between the inner seat post 222 and outer seat tube 224, the lost motion coupling automatically withdraws the latch member 228 toward its unlatched condition, as depicted in FIG. 22. After the seat height change has been accomplished, the operator returns the remote actuator 324 to its unactuated condition, and the relaxation in cable tension permits the latch member 228 to return to its latched position, i.e., back to the position shown in FIG. 20.

In this third alternative embodiment of the invention, the latch member 228 is shown comprising a generally hollow locking pin slidable along a transverse pin axis between the latched and unlatched positions. Here, the lost motion coupling takes the form of a terminal end 402 of the cable 328 which can slide within a hollow inner chamber 404 of the locking pin. A coil spring 406 is also contained within the hollow inner chamber 404 and acts between the terminal end 402 of the cable 322 and a removable cap 408, which is threaded on the end of the locking pin and functions to enclose the hollow inner chamber 404. Thus, as can be seen upon comparative review of FIGS. 20-22, the lost motion coupling functions in this embodiment by the travel of the terminal end 402 of the cable 328 within the hollow inner chamber 404 of the latch member 228. The coil spring 406 compresses and stores sufficient energy to extract the latch member 228 as soon as the dominant shearing force 400 is sufficiently diminished.

A return spring 358 is disposed about the exterior of the latch member 228 and continually urges the latch member 228 toward its latched position. The return spring 358 is substantially weaker in terms of its spring constant as compared with the coil spring 406 which forms part of the lost motion coupling. Therefore, although the two springs effectively act in opposite directions, the return spring 358 can be overcome when the remote actuator 324 is moved to its fully actuated position. The return spring 358 bears against a stop shoulder 410 at one end and against a gasket 412 at its other end. The gasket 412 is sandwiched between an end cap 332 and the projection portion 282 of the housing 280. Cap screws 334 hold the end cap 332 together with the gasket 412 in position.

The subject invention, as presented in both the first (FIGS. 1-7) and third (FIGS. 17-22) embodiments, teach a method for selectively moving the bicycle seat 40 between at least two positions of height adjustment while the bicycle is being ridden. The method here comprises the steps of providing a bicycle having a seat 40 and providing an adjustable seat support 20, 220 comprising upper 22, 222 and lower 24, 224 telescopic members. Those skilled in the art will really appreciate that, while the upper 22, 222 and lower 24, 224 telescopic members have been described specifically as an inner seat post 22, 222 and an outer seat tube 24, 224, respectively, this is not a limiting factor when practicing the concepts of this invention. Rather, the upper telescopic member could be an outer tube, and the lower telescopic member could be an inner post. Other variants and mechanical equivalents are also possible.

The subject method further includes the step of supporting the seat 40 on the upper member 22, 222 for sliding movement between at least two height-adjusted positions. The method includes providing a latch member 28, 228, which is movable between an unlatched position in which the upper and lower members are freely telescopically movable relative to one another, and a latched position in which the upper and lower members are locked relative to one another. Furthermore, the method includes providing a remote actuator 124, 324 that is movable between actuated and unactuated positions. The method also includes the step of urging the latch member 28, 228 toward its unlatched position in response to movement of the remote actuator 124, 324 toward its actuated position. In accordance with the method, the step of trapping the latch member 28, 228 in its latched position is accomplished by applying a dominant shearing load 400 between the upper 22, 222 and lower 24, 224 members. The method is characterized by moving the remote actuator 124, 324 completely to its actuated position while the latch member 28, 228 remains trapped in its latched position, and then automatically withdrawing the latch member 28, 228 toward its unlatched position in response to a decrease in the shear loading 400 between the upper 22, 222 and lower 24, 224 members.

Additional features of the subject method include the step of holding the remote actuator 124, 324 in its actuated position while the latch member 28, 228 is automatically withdrawn toward its unlatched position. This method step is depicted in the progressive sequence in FIGS. 21 and 22. Additional perfecting steps in the subject method include operatively interconnecting the remote actuator 124, 324 to the latch member 28, 228 with a flexible motion transmitting cable 128, 328. The step of moving the remote actuator 124, 324 to its completely actuated position can be accomplished by either moving a magnet, as in the first embodiment, or by compressing a spring 406, as in the third embodiment. Of course, these are but two examples of the many practical techniques which can be used to accomplish the advantageous features of this invention.

Obviously, many modifications and variations of the present invention are possible in light of the above teachings. The invention may be practiced otherwise than as specifically described within the scope of the claims. In addition, the reference numerals in the claims are merely for convenience and are not to be read in any way as limiting.

What is claimed is:

1. An adjustable height bicycle seat post assembly comprising:
   an outer seat tube;
   an inner seat post telescopically slidably received in said outer seat tube for moving a bicycle seat between raised and lowered conditions;
   a latch member movable between an unlatched position in which said outer seat tube and said inner seat post are freely telescopically slidable relative to one another and a latched position in which said inner seat post is fixed in one of at least two height-adjusted positions relative to said outer seat tube;
   a remote actuator selectively movable between actuated and unactuated positions;
   a flexible motion transmitting cable operatively connecting said remote actuator and said latch member for moving said latch member toward said unlatched position in response to movement of said remote actuator toward said actuated position; and
   a lost motion coupling for functionally decoupling said remote actuator from said latch member in response to a dominant shearing load between said inner seat post and said outer seat tube trapping said latch member in said latched position and for automatically recoupling said remote actuator to said latch member when the dominant shearing load falls below a predetermined limit, whereby said lost motion coupling enables said remote actuator to be moved to said actuated position while said latch remains trapped in said latched position without damaging said cable and also permitting an operator to deploy said remote actuator at any convenient time prior to a desired change in seat height.

2. The assembly of claim 1, wherein said latch member simultaneously engaging said inner seat post and said outer seat tube when in said latched condition.

3. The assembly of claim 2, further including a biasing member constantly urging said inner seat tube axially outwardly of said outer seat tube toward a maximum seat height condition.

4. The assembly of claim 3, wherein said outer seat tube has an open upper end, and said inner seat post has a lower end telescopically received in said open upper end of said outer seat tube and an opposite upper end adapted to mount a bicycle seat.

5. The assembly of claim 4, wherein said latch member is connected directly to said outer seat tube.

6. The assembly of claim 2, wherein said cable is effective under tension to move said latch member.

7. The assembly of claim 6, wherein said lost motion coupling is operatively associated with said cable.

8. The assembly of claim 7, wherein said latch member comprises a locking pin slidable along a pin axis between said latched and unlatched positions.

9. The assembly of claim 8, wherein said lost motion coupling includes a magnetic switch.

10. The assembly of claim 9, wherein said magnetic switch includes a pair of switch magnets of opposite polarity.

11. The assembly of claim 10, wherein said magnetic switch includes a switch housing supporting said switch magnets for sliding movement relative to said latch member, and said latch member moves under the influence of a changing magnetic field in response to moving said switch magnets.

12. The assembly of claim 8, wherein said lost motion coupling includes a spring.

13. The assembly of claim 12, wherein said spring comprises a helically coiled compression spring.

14. The assembly of claim 12, wherein said cable has at least one end fitting, and said lost motion coupling includes a spring operatively disposed between said end fitting and one of said latch member and said remote actuator.

15. The assembly of claim 14, wherein said locking pin includes a hollow inner chamber, and said spring is disposed inside said hollow inner chamber.

16. The assembly of claim 15, wherein said locking pin includes a removable cap for containing said spring inside said hollow inner chamber.

17. The assembly of claim 12, wherein said locking pin includes a stop shoulder for limiting travel to said latched position.

18. A bicycle assembly having an on-the-fly adjustable height seat, said assembly comprising:
   a frame;
   at least two wheels rotatably supported in said frame for rolling engagement with the ground;
   a handlebar movably supported in said frame and steerably connected to at least one of said wheels;
   a seat for supporting a rider;
   an outer seat tube;
   an inner seat post telescopically received in said outer seat tube and relatively movable between fully retracted and fully extended positions, one of said inner seat post and said outer seat tube connected to said seat and movable therewith;
   a latch member movable between an unlatched position in which said outer seat tube and said inner seat post are freely telescopically slidable relative to one another and a latched position in which said inner seat post is fixed in one of at least two height-adjusted positions relative to said outer seat tube;

a remote actuator disposed on said handlebar and selectively movable between actuated and unactuated positions;

a flexible motion transmitting cable operatively connecting said remote actuator and said latch member for moving said latch member toward said unlatched position in response to movement of said remote actuator toward said actuated position; and a lost motion coupling for functionally decoupling said remote actuator from said latch member in response to a dominant shearing load between said inner seat post and said outer seat tube trapping said latch member in said latched position and for automatically recoupling said remote actuator to said latch member when the dominant shearing load falls below a predetermined limit, whereby said lost motion coupling enables said remote actuator to be moved to said actuated position while said latch remains trapped in said latched position without damaging said cable and also permitting an operator to deploy said remote actuator to a desired change in seat height.

19. The assembly of claim 18, wherein said latch member simultaneously engaging said inner seat post and said outer seat tube when in said latched condition.

20. The assembly of claim 19, wherein a biasing member constantly urging said inner seat tube axially outwardly of said outer seat tube toward a maximum seat height condition.

21. The assembly of claim 20, wherein said outer seat tube fixedly attached to said frame and has an open upper end, and said inner seat post has a lower end telescopically received in said open upper end of said outer seat tube and an opposite upper end adapted to mount said seat.

22. The assembly of claim 21, wherein said latch member is connected directly to said outer seat tube.

23. The assembly of claim 22, wherein said cable is effective under tension to move said latch member.

24. The assembly of claim 23, wherein said lost motion coupling is operatively associated with said cable.

25. The assembly of claim 24, wherein said latch member comprises a locking pin slidable along a pin axis between said latched and unlatched positions.

26. The assembly of claim 25, wherein said lost motion coupling includes a magnetic switch.

27. The assembly of claim 25, wherein said lost motion coupling includes a spring.

28. The assembly of claim 27, wherein said spring comprises a helically coiled compression spring.

29. The assembly of claim 27, wherein said cable has at least one end fitting, and said lost motion coupling includes a spring operatively disposed between said end fitting, and one of said latch member and said remote actuator.

30. The assembly of claim 29, wherein said locking pin includes a hollow inner chamber, and said spring is disposed inside said hollow inner chamber.

31. The assembly of claim 30, wherein said locking pin includes a removable cap for containing said spring inside said hollow inner chamber.

32. The assembly of claim 27, wherein said locking pin includes a stop shoulder for limiting travel to said latched position.

33. A method for selectively moving a bicycle seat between at least two positions of height adjustment while the bicycle is being ridden, said method comprising the steps of:

providing a bicycle having a seat;

providing an adjustable seat post support comprising upper and lower telescopic members;

supporting the seat on the upper member for sliding movement between at least two height-adjusted positions;

providing a latch member movable between an unlatched position in which the upper and lower members are freely telescopically moveable relative to one another and a latched position in which the upper and lower members are locked relative to one another;

providing a remote actuator moveable between actuated and unactuated positions;

urging the latch member toward the unlatched position in response to movement of the remote actuator toward the actuated position;

trapping the latch member in the latched position by applying a dominant shearing load between the upper and lower members;

moving the remote actuator completely to its actuated position while the latch member remains trapped in its latched position and then automatically withdrawing the latch member toward its unlatched position in response to a decrease in the shear loading between the upper and lower members.

34. The method of claim 33, wherein said step of moving the remote actuator completely to its actuated position while the latch remains trapped in its latched position further includes the step of holding the remote actuator in the actuated position while the latch member is automatically withdrawn toward its unlatched position.

35. The method of claim 33 further including the step of operatively interconnecting the remote actuator to the latch member with a flexible motion transmitting cable.

36. The method of claim 35, wherein said step of moving the remote actuator completely to its actuated position while the latch remains trapped in its latched position further includes compressing a spring.

37. The method of claim 35, wherein said step of moving the remote actuator completely to its actuated position while the latch remains trapped in its latched position further includes moving a magnet.

38. The method of claim 33, wherein said step of supporting the seat on the upper and lower members further includes continuously biasing the upper member of the adjustable seat support toward a telescopically extended condition.

* * * * *